United States Patent [19]

Raines

[11] Patent Number: 4,556,086
[45] Date of Patent: Dec. 3, 1985

[54] DUAL DISC LOW PRESSURE BACK-CHECK VALVE

[75] Inventor: Kenneth C. Raines, Bethlehem, Pa.

[73] Assignee: Burron Medical Inc., Bethlehem, Pa.

[21] Appl. No.: 654,483

[22] Filed: Sep. 26, 1984

[51] Int. Cl.$^4$ ............................................. F16K 15/14
[52] U.S. Cl. ................................... 137/852; 137/843; 604/247
[58] Field of Search ............... 137/843, 852, 855, 856; 251/368; 604/247

[56] References Cited

U.S. PATENT DOCUMENTS

| | | | |
|---|---|---|---|
| 2,800,920 | 7/1957 | Smith | 137/856 |
| 3,625,211 | 12/1971 | Butler | 604/246 |
| 3,807,445 | 4/1974 | McPhee | 137/843 |
| 3,889,710 | 6/1975 | Brost | 137/843 |
| 4,141,379 | 2/1979 | Manske | 604/246 |
| 4,222,407 | 9/1980 | Ruschke et al. | 137/855 |
| 4,354,492 | 10/1982 | McPhee | 604/247 |
| 4,415,003 | 11/1983 | Paradis et al. | 137/843 |

*Primary Examiner*—Martin P. Schwadron
*Assistant Examiner*—Sheri M. Novack
*Attorney, Agent, or Firm*—Shoemaker and Mattare, Ltd.

[57] ABSTRACT

A low pressure back-check valve comprising a valve housing with a fluid inlet and outlet, a valve seat, and a dual disc valve element normally biased into closed position against the valve seat by mechanical support structure within the housing. One of the dual discs is made of pure gum rubber and/or like material, while the other disc is made of semi-rigid plastic material, such as unplasticized Polyvinyl Chloride (PVC). The mechanical support structure includes a pair of pins spaced 180° apart. While these pins constantly hold the dual discs in biased position against the valve seat, because of the compliant construction of the dual discs, the valve can open under a very low pressure, such as 0.02 pounds per square inch.

13 Claims, 4 Drawing Figures

U.S. Patent   Dec. 3, 1985   4,556,086
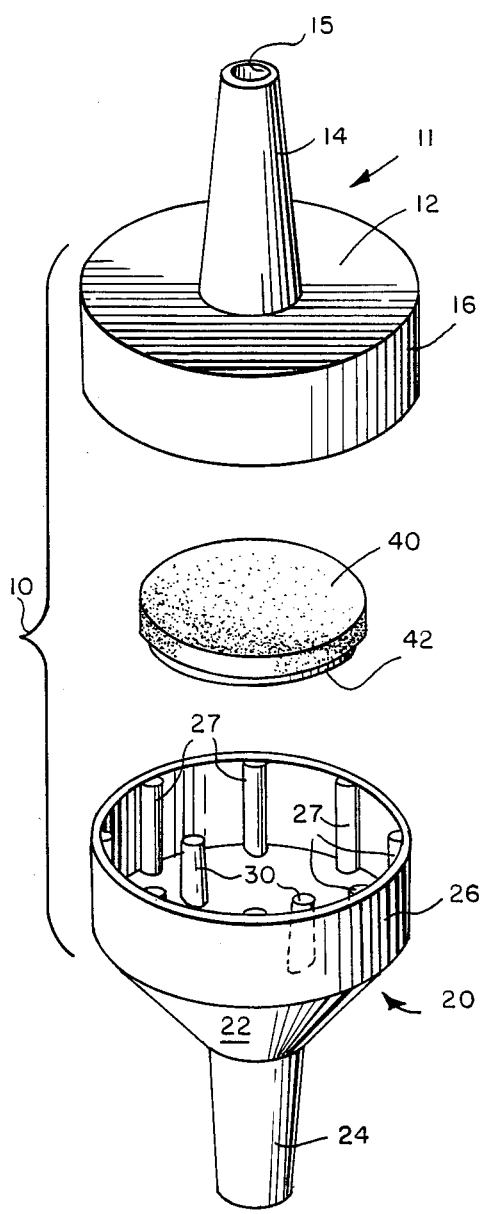
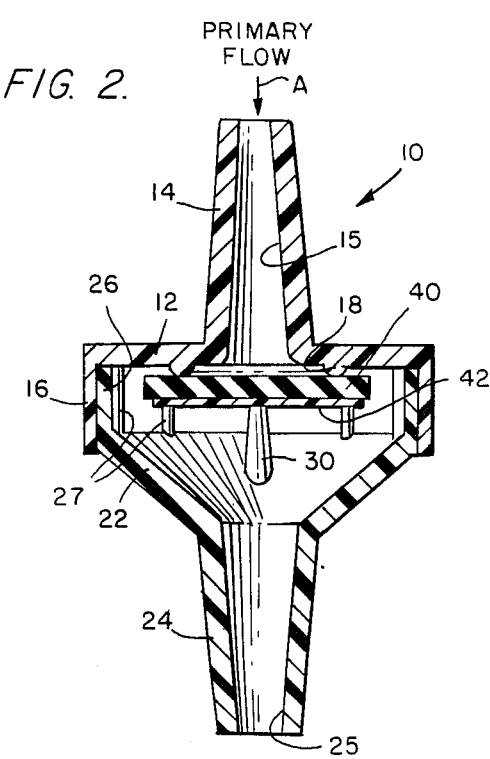
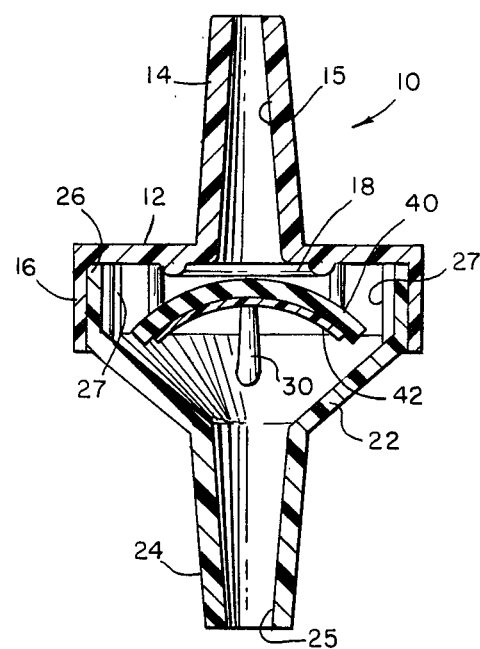
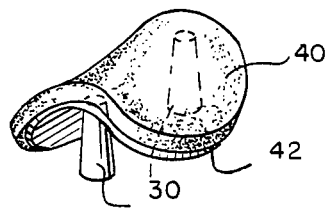

DUAL DISC LOW PRESSURE BACK-CHECK VALVE

BACKGROUND OF THE INVENTION

1. Field of the Invention

This invention relates generally to back-check valves for permitting pressurized fluid flow in only one direction, and particularly for valves suitable for use in medical administration sets.

2. Description of the Prior Art

A common problem with known type check valves is the lack of sensitivity thereof. Also, often they fail to function properly and/or leak fluid therefrom during use.

Another common problem of known one-way valves is with the valve disc per se, that is, the disc does not fit properly, or a peripheral edge engages, binds, or sticks against an inner surface of the valve body.

A still further problem is that the known type valve discs leave much to be desired in flexibility and/or semi-rigidness. The materials generally used for such discs fail to meet all of the desired performance qualities, and still be relatively inexpensive.

Existing prior patents which may be pertinent to this invention are as follows:

| | | |
|---|---|---|
| 3,625,211 | Butler | 12/7/71 |
| 3,889,710 | Brost | 6/17/75 |
| 4,141,379 | Manske | 2/27/79 |
| 4,222,407 | Ruschke, et al | 9/16/80 |
| 4,354,492 | McPhee | 10/19/82 |

The U.S. Pat. No. 3,625,211 to Butler, shows a medical administering set of the type with which the present invention is preferably used. However, the valve structure of this patent is entirely different from that of the present invention.

U.S. Pat. No. 3,889,710 to Brost, discloses a single disc element 13 which is shown in the closed position in FIG. 5 and in the open position in FIG. 6 of the drawings; however, in neither of these positions is the single disc mechanically biased against the valve seat. Also, there is nothing in this disclosure to teach the desirability of having a valve member of dual disc construction as in the present invention.

The Manske U.S. Pat. No. 4,141,379 discloses a flexible diaphragm 48 comprised of a screen 52, and in its center a resilient disc 54 which either rests loosely on screen 52 or is secured thereto by adhesive. While this structure is somewhat related to that of the present invention, neither the dual disc construction as disclosed herein, nor the positive mechanical biasing of the dual disc against the valve seat in normally closed position is taught by this patent.

The Ruschke, et al U.S. Pat. No. 4,222,407 discloses a single valve member which is biased against the valve seat by a rib 58 which extends traversely entirely across the valve body housing. Again, only a single valve member disc is disclosed, and the biasing arrangement is substantially different from that of the present invention.

U.S. Pat. No. 4,354,492 to McPhee, discloses a single flexible valve disc member which is not mechanically biased against the valve seat, but is free floating at all times within the valve housing. Also, a predetermined spacing distance between the valve disc member and the valve seat is also important in this device.

None of the known prior art devices offers the new and novel features of the present invention.

SUMMARY OF THE INVENTION

An object of the present invention is to provide a simple yet reliable back-check valve comprising only a few components, including a dual disc valve element.

Another object of this invention is to provide a simple and inexpensive dual disc check valve with one disc of flexible material and the other one of semi-rigid material.

A further object of this invention is to provide a one-way valve device having dual discs therein; a first disc of rubber or rubber-like material to effect a seal, and the second disc of semi-rigid plastic to support and prevent distortion of the rubber disc.

A still further object is for a back-check valve which will function at very low fluid pressures with dual valve discs normally biased in the closed position.

Yet another object is a check valve with dual discs which is capable of responding to relatively low pressure differentials.

The present invention has a valve housing with a fluid inlet and outlet, a valve seat, and a dual disc valve element which is positively biased into normally a closed position against the valve seat. This is effected by mechanical support structure comprising a pair of pins spaced 180° apart. These pins constantly hold the dual disc in biased position against the valve seat.

The dual disc is of flexible, compliant construction with one disc being made of semi-rigid plastic material, such as unplasticized Polyvinyl Chloride (PVC), while the other is made of pure gum rubber and/or like material. Because of the flexible, compliant nature of this dual disc construction, the disc structure can open under a very low pressure, such as 0.02 pounds per square inch. This, of course, effectively increases the operating efficiency of the over-all check valve.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an exploded perspective view of the present invention ready for assembly.

FIG. 2 is a side elevational view in cross-section, taken across the center of the valve, showing the dual discs in valve closed position.

FIG. 3 is a view like FIG. 2, but with the dual discs in valve open position.

FIG. 4 is a perspective view of the dual discs per se as supported on the pair of support pins with the discs in valve open position.

DESCRIPTION OF THE PREFERRED EMBODIMENT(S)

Looking at FIG. 1 of the drawings, reference numeral 10 indicates, in exploded perspective, the present invention. As shown, an upper body element 11 has a surface flange 12 with a depending circumferential axially extending flange 16 integral therewith. A center cone projection 14 having a central aperture therethrough 15 is provided in the center of the horizontal flange 12 and opens into the interior of the body element 11.

A lower body element 20 has an upwardly expanding cone portion 22 integral therewith, with the upper circumference of the cone having a peripheral axially extending flange 26. A projection 24 of slightly tapered cone shape extends from the cone 22 in the opposite direction. A central aperture 25 through projection 24 permits egress of liquid from the check valve in use.

Provided around the inner circumference of the flange 26 of the lower body element 20 are a plurality of ribs 27. The purpose of ribs 27 is to prevent any binding whatsoever of the circumferential edges of the dual disc valve member in case it should slip from its center position within the overall body after assembly of the two body elements 11 and 20.

The dual disc valve member comprises a disc 40 of rubber or rubber-like material and a disc 42 of semi-rigid plastic material. This dual disc construction is supported upon upright pins 30 in the lower body element 20. After assembly into the assembled position as depicted in FIG. 2, the respective pair of pins 30, at 180° to each other, firmly and positively bias the disc 40 into engagement with the valve seat 18 of the upper body element 11. As shown in FIG. 2, the normal position of the device is with the valve member in closed position. Thus, no flow of liquid normally occurs through the valve. However, because of the great improvement achieved by this invention, the dual valve disc will open under very, very low pressures, such as 0.02 pounds per square inch, which thus is a great improvement over the known prior art.

The second valve disc of semi-rigid plastic 42, slightly smaller in diameter, preferably is made of unplasticized plastic and it has been found that unplasticized Polyvinyl Chloride film works extremely well. Also, for the rubber disc 40, pure gum floating stock has been found to work extremely well. However, the disc 40 also can be made of rubber-like material and silicone material has been found to work quite well.

FIG. 3 shows the dual valve disc construction in the open, full flow position, and shows how the dual pins 30 support the disc in this position and, of course, any tendency of the dual disc to move sidewise into engagement with the interior of the body element 20 would be prevented from causing any problem by the ribs 27.

FIG. 4 shows the dual disc in the open position of FIG. 3, with the shape depicted in perspective.

Tests have indicated that the following sizes, compositions and so forth work very well with the improved check valve of the present invention.

I. RUBBER DISC: Tan Pure Gum Floating Stock

A. Die cut from flat sheet stock
B. Diameter: 0.375 inches
C. Thickness: 0.031 inches
D. Durometer: 40±5 Shore A
E. Specific Gravity: 0.92
F. Tensile Strength 2,500 PSI (approximately)
G. Ultimate Elongation: 650% minimum An alternative to the natural rubber disc would be silicone rubber. Material produced by Dow Corning, under their trademark SILASTIC, is acceptable.

H. Durometer: 40–50
I. Specific Gravity: 1.12–1.18
J. Tensile Strength: 1,000 PSI
K. Elongation: 650% minimum II. PLASTIC DISC: Unplasticized Polyvinyl Chloride (PVC) Film A. Die cut from flat sheet stock
B. Diameter: 0.350 inches
C. Thickness: 7–7½ mil.
D. Specific Gravity: 1.3
E. Tensile Strength: 5,700 PSI
F. Elongation: 125%
G. Rockwell Hardness: R98–106

The reason for the plastic disc being slightly smaller in diameter than the rubber disc is to reduce the chance of air bubbles clinging to the edge of the discs. In actual practice, this arrangement has been discovered to be very beneficial for this purpose.

The foregoing is considered as illustrative only of the principles of the invention. Further, since numerous modifications and changes will readily occur to those skilled in the art, it is not desired to limit the invention to the exact construction shown and described, and, accordingly, all suitable modifications and equivalents may be resorted to, falling within the scope of the invention.

What is claimed is:

1. A one-way check valve which comprises:
   a valve housing having a valve seat,
   valve element means within said valve housing for opening with a pressure differential of less than two inches of water and which is biased against the valve seat in a normally closed position,
   a pair of support pins for holding said valve element means in said biased normally closed position, said valve element means including a flexible disc and a semi-rigid disc, said semi-rigid disc being of slightly smaller diameter than said flexible disc to reduce the chance of air bubbles clinging to the edge of the discs, said pair of support pins being within said valve housing, and these two pins being spaced 180° from each other.

2. A one-way check valve as set forth in claim 1, wherein said flexible disc is made of rubber and the semi-rigid disc is made of plastic.

3. A one-way check valve as set forth in claim 2, wherein said rubber is pure gum floating stock and said plastic is unplasticized Polyvinyl Chloride film.

4. A one-way check valve as set forth in claim 1, wherein said flexible disc is made of rubber-like material and the semi-rigid disc is made of plastic.

5. A one-way check valve as set forth in claim 4, wherein said rubber-like material is silicone rubber and said plastic is unplasticized Polyvinyl Chloride film.

6. A one-way check valve as set forth in claim 1, wherein said flexible disc is substantially thicker than said semi-rigid disc.

7. A one-way check valve as set forth in claim 6, wherein said flexible disc is approximately 0.030 inches in thickness, and said semi-rigid disc is approximately 0.007 inches in thickness.

8. A medical liquid back-check valve comprising:
   a housing having a fluid flow inlet,
   a fluid flow outlet and a valve seat therebetween,
   compliant valve means permanently biased by mechanical support means against said valve seat,
   said valve means formed of two different materials for effecting efficient sealing and yet permitting valve opening at a very low pressure, and
   said compliant valve means includes a pair of discs, one disc being of flexible, resilient material and the other disc being of semi-rigid material, said semi-rigid disc being of slightly smaller diameter than said flexible disc to reduce the change of air bubbles clinging to the edge of the discs, said mechanical support means comprises only a pair of spaced pins, each of said pins being within said valve housing, and these pins being spaced 180° from each other.

9. A medical liquid back-check valve as in claim 8, wherein said flexible, resilient material is rubber or the like, and said semi-rigid material is unplasticized plastic.

10. A medical liquid back-check valve as in claim 8, wherein said pair of discs are each substantially thinner than the width thereof, and said one disc is substantially thicker than said other disc.

11. A medical liquid back-check valve as in claim 10, wherein said one disc directly abuts said valve seat, and said other disc is between said one disc and said mechanical support means.

12. A medical liquid back-check valve as in claim 8, wherein said flexible disc is approximately 0.030 inches in thickness, and said semi-rigid disc is approximately 0.007 inches in thickness.

13. A medical liquid back-check valve as in claim 12, wherein said resilient material is silicone rubber and said plastic is unplasticized Polyvinyl Chloride film.

* * * * *